United States Patent [19]
Jopson

[11] Patent Number: 5,745,273
[45] Date of Patent: Apr. 28, 1998

[54] DEVICE FOR SINGLE SIDEBAND MODULATION OF AN OPTICAL SIGNAL

[75] Inventor: Robert Meachem Jopson, Rumson, N.J.

[73] Assignee: Lucent Technologies Inc., Murray Hill, N.J.

[21] Appl. No.: 772,444

[22] Filed: Nov. 27, 1996

[51] Int. Cl.⁶ .................................................. H04B 10/04
[52] U.S. Cl. .................... 359/181; 359/156; 359/245; 375/301; 455/109; 332/170
[58] Field of Search ........................... 359/180–181, 359/182, 184, 162, 276, 156, 245; 385/3, 8; 375/301; 455/109; 332/170

[56] References Cited

U.S. PATENT DOCUMENTS 5,526,162   6/1996   Bergano .......................... 359/181

OTHER PUBLICATIONS

Yonenaga et al; "A Fiber Chromatic Dispersion Compenstion Technique With an Optical SSB Transmission in Optical Homodyne Detection Systems", IEEE Photonic Technology Letters, vol. 5, No. 8, Aug. 1993. pp. 949–951.

*Primary Examiner*—Kinfe-Michael Negash

[57] ABSTRACT

A single sideband modulator circuit for modulating an optical signal with an RF signal to provide a frequency shift to the optical signal. The modulator circuit utilizes a dual path modulator having an electrical terminal and two optical terminals. An RF signal is provided to the electrical terminal and an optical signal is provided to each optical terminal so that the optical signal input to one terminal travels in the direction of the RF signal to produce an output optical signal having a carrier band and a single sideband, and the optical signal input to the other optical terminal travels in the opposite direction of the RF signal to produce an output having only a carrier band. A coupler adds the resulting optical output signals so that the carrier bands are cancelled, leaving only the sideband.

8 Claims, 4 Drawing Sheets

FIG. 1
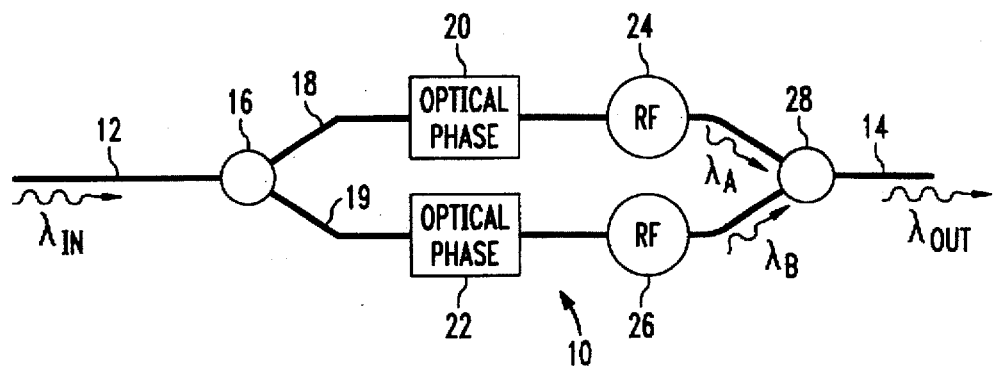
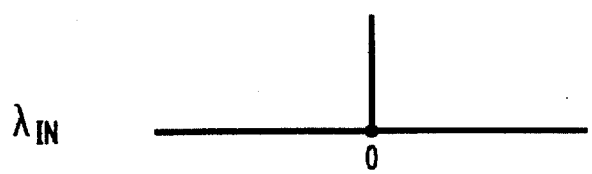
$\lambda_{IN}$     FIG. 2A
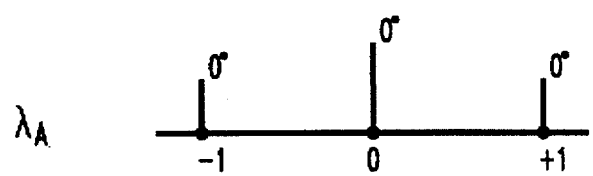
$\lambda_A$     FIG. 2B
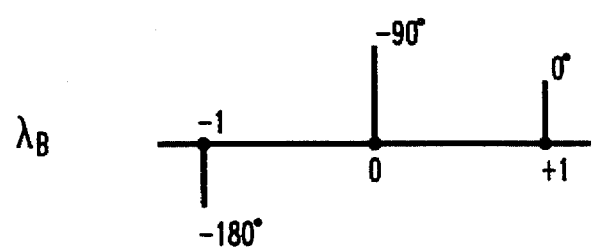
$\lambda_B$     FIG. 2C
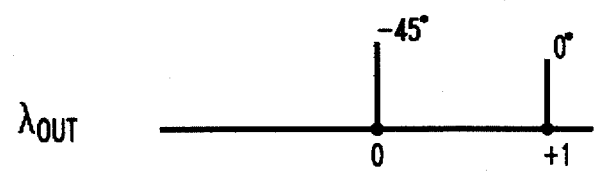
$\lambda_{OUT}$     FIG. 2D

DEVICE FOR SINGLE SIDEBAND MODULATION OF AN OPTICAL SIGNAL

BACKGROUND OF THE INVENTION

I. Field of the Invention

The present invention pertains to a device for shifting the frequency of an optical signal. More particularly, the present invention relates to a device for shifting the frequency of an optical signal through single sideband modulation.

II. Description of the Related Art

In U.S. Pat. No. 5,101,291, an optical frequency shifting device for shifting the frequency of an optical signal is disclosed. The therein disclosed optical frequency shifting device utilizes acoustooptic scattering through a Bragg cell having an acoustic wave propagating therethrough. The frequency of an optical signal applied to the Bragg cell is shifted (upward or downward) by an amount equal to twice the frequency of the acoustic wave. As explained in the aforementioned patent, by incorporating the Bragg cell frequency shift apparatus in an optical loop circuit, an optical frequency comb having a plurality of channels or carriers is formed.

In a commonly owned and pending U.S. patent application Ser. No. 08/742,712 entitled *Optical Frequency Conversion Device* which was filed in the U.S. Patent and Trademark Office on Nov. 1, 1996, several other devices and techniques are disclosed for shifting the frequency of an optical signal. The frequency shifting devices employed therein include magnetooptic scattering through a Bragg cell, acoustooptic scattering through a waveguide, and single sideband modulation utilizing a technique more fully described in Izutsu et al., *Integrated Optical Single Sideband Modulator/Frequency Shifter*, J. Quant. Electron. QE-17, 2225, 1981.

With reference now to FIG. 1, an optical circuit 10 of the type disclosed in the aforementioned patent application for performing single sideband modulation of an optical signal $\lambda_{in}$ is shown. Optical signal $\lambda_{in}$ is provided to an input fiber 12 connected to a coupler/splitter 16 which, as is known in the art, divides $\lambda_{in}$ into two portions that are fed to branches 18 and 19. Each branch has an optical phase adjust circuit 20, 22 and an RF modulator 24, 26. The optical phase adjust circuits adjust the phase angles of the portions of $\lambda_{in}$ applied to each branch and the adjusted optical signal portions are then modulated by an RF signal provided by an oscillator (not shown) to produce sidebands for each optical signal portion. The outputs of the RF modulators are shown as $\lambda_A$ and $\lambda_B$, respectively. Each RF modulator 24, 26 also contains an RF phase adjust circuit (not shown) to adjust or select the phase angle of the RF signal. The output signals $\lambda_A$, $\lambda_B$ are combined by a combiner/splitter 28 to form an output optical signal $\lambda_{out}$ that is output on fiber 14. By selecting the phase angles for the optical signal portions and the RF signals, the unwanted sidebands can be cancelled out when the optical signals are combined by combiner/splitter 28, thus generating a frequency shift for the optical signal $\lambda_{in}$.

With reference now to FIGS. 2A–2D, the frequency domain representations of the optical signals are there shown. The input signal is shown in FIG. 2A and the upper branch signal $\lambda_A$ is shown in FIG. 2B and is achieved by the optical phase adjust circuit 20 providing 0° of phase shift and the RF modulator 24 also providing a 0° phase angle. The carrier also has a 0° phase angle. FIG. 2C shows $\lambda_B$ which is achieved by a value of −90° for optical phase adjust circuit 22 and a value of 90° for the phase angle of RF modulator 26. Thus $\lambda_B$ results in a lower sideband phase angle of −180° (n=−1), an upper sideband phase angle of 0° (n=+1), and a carrier phase angle of −90° (only the carrier and the lower and upper sidebands are shown). When $\lambda_A$ and $\lambda_B$ are combined (FIG. 2D) by combiner/splitter 28, the carrier band has a phase angle of −45° and an upper sideband phase angle of 0°, whereas the lower sidebands from $\lambda_A$ and $\lambda_B$ cancel out.

The difficulty associated with the single sideband modulator circuit of FIG. 1 is that only one sideband (either upper or lower), corresponding to a frequency shift of $\lambda_{in}$, is desired. In other words, the carrier band is not needed but is, nevertheless, present. The carrier band can be removed if one RF modulator modulates the amplitude of the optical signal in branch 18 and the other RF modulator modulates the phase of the optical signal in branch 19; however, precise and reliable amplitude RF modulators are difficult to construct. Thus, additional branches are required to cancel out the carrier band, such as the four branch configuration shown in FIG. 5 of the aforementioned patent application. As can be appreciated, the requirement for such additional branches adds to the cost of the optical circuit 10, which increases the cost of implementing a fiber optic communication system incorporating the circuit.

SUMMARY OF THE INVENTION

The inventive single sideband optical frequency modulation device utilizes dual path modulators in a loop configuration to generate a frequency shift of an input optical signal by generating a single sideband of the optical signal. The input optical signal is provided to both the forward and reverse directions of a dual path modulator which is connected to an RF modulator. The RF modulator modulates or frequency shifts the forward applied input signal to generate sidebands, and passes (without modulation) a reverse applied input signal so that no sidebands are generated. By properly selecting the phase angles of the RF signal, when the forward applied modulated optical signal and the reverse applied modulated optical signal are combined, the carrier band is cancelled and a single sideband corresponding to a frequency shifted optical signal results.

In another embodiment, two dual path modulators are arranged in a circuit in opposing relation so that, in one direction (e.g. clockwise), an optical signal passes through a first dual path modulator in a forward direction (i.e. in the direction of the RF signal) and passes through a second dual path modulator in a reverse direction. By providing an optical signal to such a circuit so that the optical signal travels simultaneously in both directions (clockwise and counter-clockwise) and by adjusting the phase angles of the optical signal and RF signal, two in-phase sidebands will result which, when added together, yield a shifted optical signal having increased power. In other words, by adding the two sidebands together, a resulting signal will have approximately twice the power as a single sideband.

In yet another embodiment, a single dual path modulator having an RF signal applied thereto for simultaneously modulating an optical signal in both directions (clockwise and counter-clockwise) is used. The single dual path modulator is connected to an RF modulator which provides two RF signals: one for modulating an optical signal in one direction (e.g. clockwise), and another for modulating an optical signal in another direction (e.g. counter-clockwise). RF phase angle adjust circuits and optical signal phase angle adjust circuits are used to adjust the phase angles of the RF signals and optical signals, respectively. When an optical signal passes through the single dual path modulator in either direction, sidebands are generated. By properly selecting the RF and optical phase angles and adding the modulated optical signals (i.e. the clockwise and counter-clockwise optical signals), the unwanted sidebands and carrier band are canceled, thus yielding a combined single sideband (one sideband from each optical signal) having approximately twice the power as a single sideband generated from only one optical signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 1 is a previously disclosed single sideband optical circuit for modulating an optical signal;

FIGS. 2A–2D are graphical representations of optical signal frequency spectrums processed by the circuit of FIG. 1;

DETAILED DESCRIPTION OF THE PRESENTLY PREFERRED EMBODIMENTS

Figure 3:
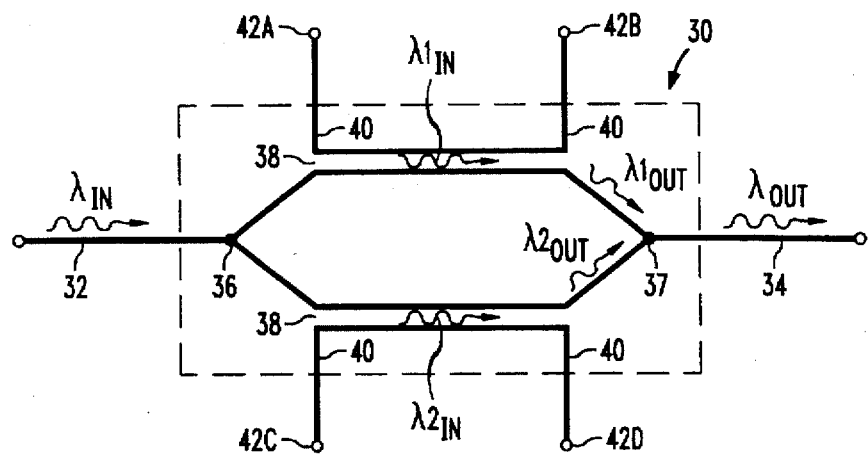
FIG. 3 is a schematic representation of a dual path modulator.

The inventive single sideband modulator circuits discussed hereinbelow utilize dual path modulators for shifting the frequency of an incoming optical signal by mixing it with an RF signal. FIG. 3 depicts a schematic representation of a dual path modulator 30. As there shown, an optical fiber 32 provides an optical signal $\lambda_{in}$ to a terminal comprising a coupler/splitter 36 which divides the optical signal into two portions $\lambda 1_{in}$ and $\lambda 2_{in}$. Each optical signal portion is routed to a separate waveguide 38. Each waveguide runs parallel for some distance to microstrips 40 which are connected to electrical terminals 42A–42D. By applying RF signals to the electrical terminals 42 in an appropriate manner, the optical signal portions in optical waveguides 38 can be altered (e.g. phase modulated in frequency by the RF signal frequency). The resulting modulated optical signals ($\lambda 1_{out}$ and $\lambda 2_{out}$) are then combined by a coupler/splitter 37 at another terminal and output as $\lambda_{out}$ on optical fiber 34.

As is known by those having ordinary skill in the art, dual path modulators are symmetrical devices, e.g. either terminal 36 or 37 can function as an input and/or an output for an optical signal. In addition, for certain modulation frequencies—which are dictated by the physical properties of the dual path modulators—an incoming optical signal will only be modulated by an RF signal applied to terminals 42 if the optical signal flows in the direction of the RF signal; otherwise the optical signal will exit the dual path modulator 30 having the same modulation as when it entered. For example, if an appropriate RF signal for a particular dual path modulator is applied to terminal 42A so that it exits at terminal 42B, then an optical signal input to the dual path modulator 30 via optical fiber 32 will produce sidebands as a result of mixing with the RF signal, and the resulting optical signal (carrier band plus sidebands) will be output on fiber 34. However, if an optical signal is input to the dual path modulator via fiber 34 so that the optical signal travels in a direction opposite to the direction of the applied RF signal, then, for certain RF frequencies, the optical signal will not be modulated and only the carrier band will be output. Thus, by applying two RF signals (one input to terminal 42A and output to terminal 42B, and the other input to terminal 42C and output to terminal 42D) and adjusting the phase angle of the RF signals and the phase angle of the optical signal portions, a substantial number of the unwanted sidebands can be reduced to a tolerable level or cancelled. Under these conditions, the optical carrier band, however, will still remain.

Figure 4:
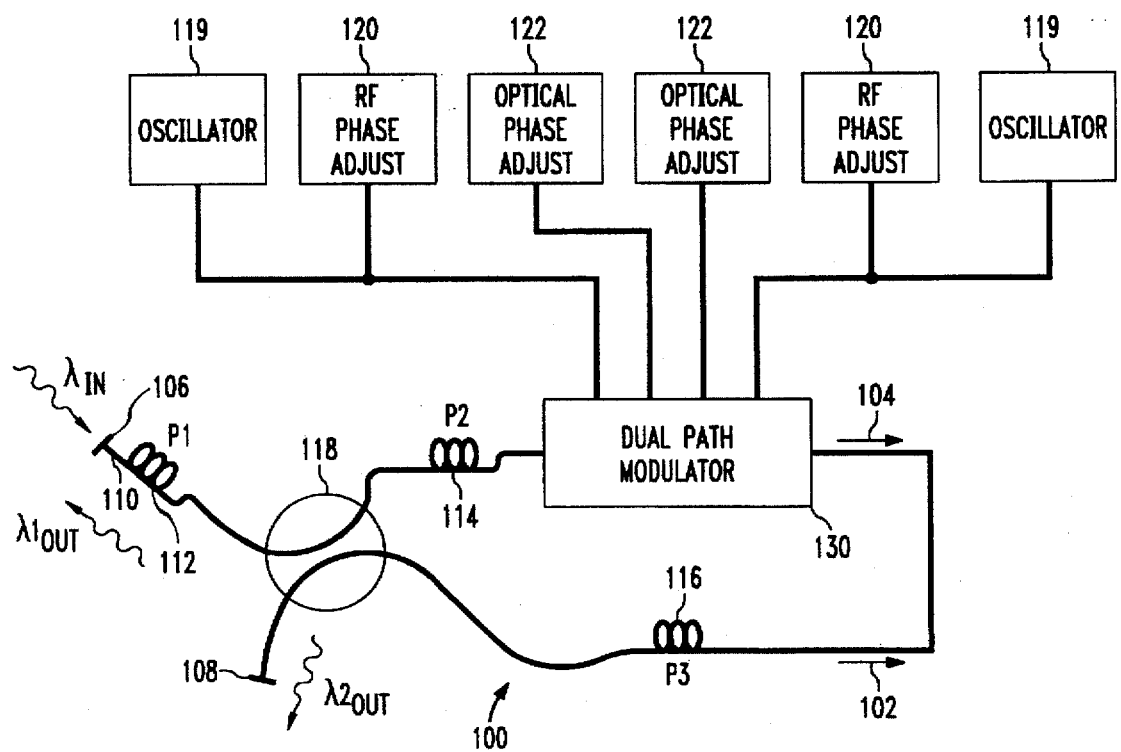
FIG. 4 is a single sideband modulator circuit using a single dual path modulator in accordance with one embodiment of the present invention.

Utilizing these principles of dual path modulators, applicant has discovered that by applying an optical signal through a dual path modulator in both directions and then combining the resulting output signals, the optical carrier band can be eliminated. One device for achieving this result is depicted in FIG. 4. As shown, a single sideband modulator circuit 100 has an optical signal $\lambda_{in}$ travelling in a counter-clockwise direction 102 and a clockwise direction 104. The circuit 100 includes a dual path modulator 130 arranged in an optical loop and having the properties more fully described above. $\lambda_{in}$ is provided to circuit 100 via an input port 106 and the polarization is adjusted, in a manner well known to those having ordinary skill in the art, by a polarizer controller 112 (P1) in FIG. 4. The polarization-controlled light is divided by a coupler/splitter 118 which provides a portion of the polarization-controlled optical signal to an optical fiber 101 in each direction (counter-clockwise and clockwise). The polarization of each portion of the optical signal can be adjusted before it is input to the dual path modulator 130. For example, the polarization of the optical signal portion in the counter-clockwise direction is controlled by a polarizer controller 116 (P3) and then input to the dual path modulator 130, and the polarization of the optical signal portion in the clockwise direction 104 is controlled by polarizer controller 114 (P2) before being input to dual path modulator 130. Polarization controllers 112 (P1) and 114 (P2) are only needed if a dual path modulator is polarization dependent.

The dual path modulator 130 is used to mix the incoming optical signal $\lambda_{in}$ with RF signals provided by RF oscillators 119 which provide an RF signal to the electrical terminals of the dual path modulator 130 in a particular direction, i.e. from left to right in FIG. 4 for modulating the clockwise portion of the optical signal, or from right to left in FIG. 4 for modulating the counter-clockwise portion of the optical signal. In other words, and with reference to FIG. 3 one oscillator 119 is applied across terminals 42A and 42B and the other oscillator 119 is applied across terminals 42C and 42D. RF phase adjust circuits 120 are provided for adjusting the phase of the RF signal provided by RF modulators 119, and optical phase adjust circuits 122 are included for adjusting the phase angles of the optical signal portions.

Assuming that an RF signal is provided to the dual path modulator 130 for modulating the counter-clockwise portion of the optical signal, the RF signal will be mixed with the counter-clockwise optical signal portion 102 so that sidebands are generated. In other words, after the counter-clockwise portion of the optical signal 102 exits the dual path modulator 130, a carrier and sidebands result. On the other hand, for an appropriately chosen modulation frequency, as the clockwise portion of optical signal 104 passes through the dual path modulator 130 in a direction opposite to that of the applied RF signal, no sidebands for the clockwise optical signal portion are generated and only the output carrier is present. When each optical signal portion is recombined by the combiner 118—which can provide portions of the combined signal to each of two output ports 108 or 110—the bands from each signal having opposite phases and equal amplitudes in a particular output port will cancel. In each output, the carrier and sidebands of each signal may depend on the phase of the RF phase adjust 120, the optical phase adjust 122, as well as polarization controller 116 and, if present, polarization controllers 112 and 114. It will be appreciated by those skilled in the art that if a particular sideband has opposite phases in one output port, e.g. 108, and thereby is cancelled at that port, that sideband will have the same phases in the other output port, e.g. 110, and will, thereby, be present at that output port in full strength. For example, assuming that the amplitudes of the carrier band portions are equal in magnitude and opposite in phase, the carrier band from the clockwise optical signal portion will cancel the carrier band of the counter-clockwise optical signal portion. Thus, an output optical signal (shown as $\lambda 1_{out}$ and $\lambda 2_{out}$) is generated having a single sideband, corresponding to a frequency shift in the input optical signal $\lambda_{in}$.

It should be noted that the splitter/coupler 118 can divide the power of the incoming and outgoing optical signals in any of various ratios, depending on the characteristics of the particular splitter/coupler used. For example, splitter/coupler 118 can divide the power of $\lambda_{in}$ so that each optical signal portion (i.e. the counter-clockwise portion and the clockwise portion) has equal power or, and as is also contemplated by the present invention, so that the coupler/splitter 118 divides the incoming optical signal into unequal portions to obtain proper cancellation of the carrier band.

For example, and as is known in the art, when sidebands of a signal are generated, the power contained by the carrier band is divided among the sidebands. Thus, and as can be appreciated, when the counter-clockwise optical signal is mixed with the RF signal in the dual path modulator 130 so that sidebands are created, the amplitude or power of the resulting carrier band will be less than the amplitude or power of the carrier band of the clockwise optical signal portion. Accordingly, when the signal portions are combined at the coupler/splitter 118, even if the phase angles of the carrier bands are opposite, the carrier bands will not fully cancel out because of the unequal power distribution. By selecting the coupler/splitter 118 in an appropriate manner so that the counter-clockwise optical signal portion contains more power than the clockwise optical signal portion, however, when the counter-clockwise optical signal portion is processed by the dual path modulator so that sidebands are created and then coupled to output port 108, the resulting output carrier band will have the same or substantially the same power as the output carrier band in output port 108 of the clockwise optical signal portion.

The resulting output optical signal $\lambda 1_{out}$ or $\lambda 2_{out}$ can be fed back or reflected into the input port 106 so that additional sidebands are generated, thus eventually forming an optical frequency comb comprised of a plurality of spaced optical frequency carriers having frequency spacings substantially equal to the RF frequency of the RF signal generated by RF modulator/oscillator 119. As can be appreciated, such an optical comb can have a variety of uses and accommodates a plurality of carriers for use in an optical communications data network. Suitable dual path modulators for use in the preferred embodiments discussed herein are Mach-Zehnder modulators.

It should be noted that although the embodiments described herein contemplate and discuss a modulated signal having a carrier band and at least one sideband so that the carrier band cancels out upon adding the two signals that pass through the dual path modulator in opposite directions, the modulated signal may, alternatively, contain multiple sidebands without a carrier present. For example, instead of passing the carrier band in either direction, the dual path modulator 130 may be designed to block the carrier band and, instead, produce unwanted sidebands which will be cancelled out upon combining the clockwise and counter-clockwise optical signals.

Figure 5:
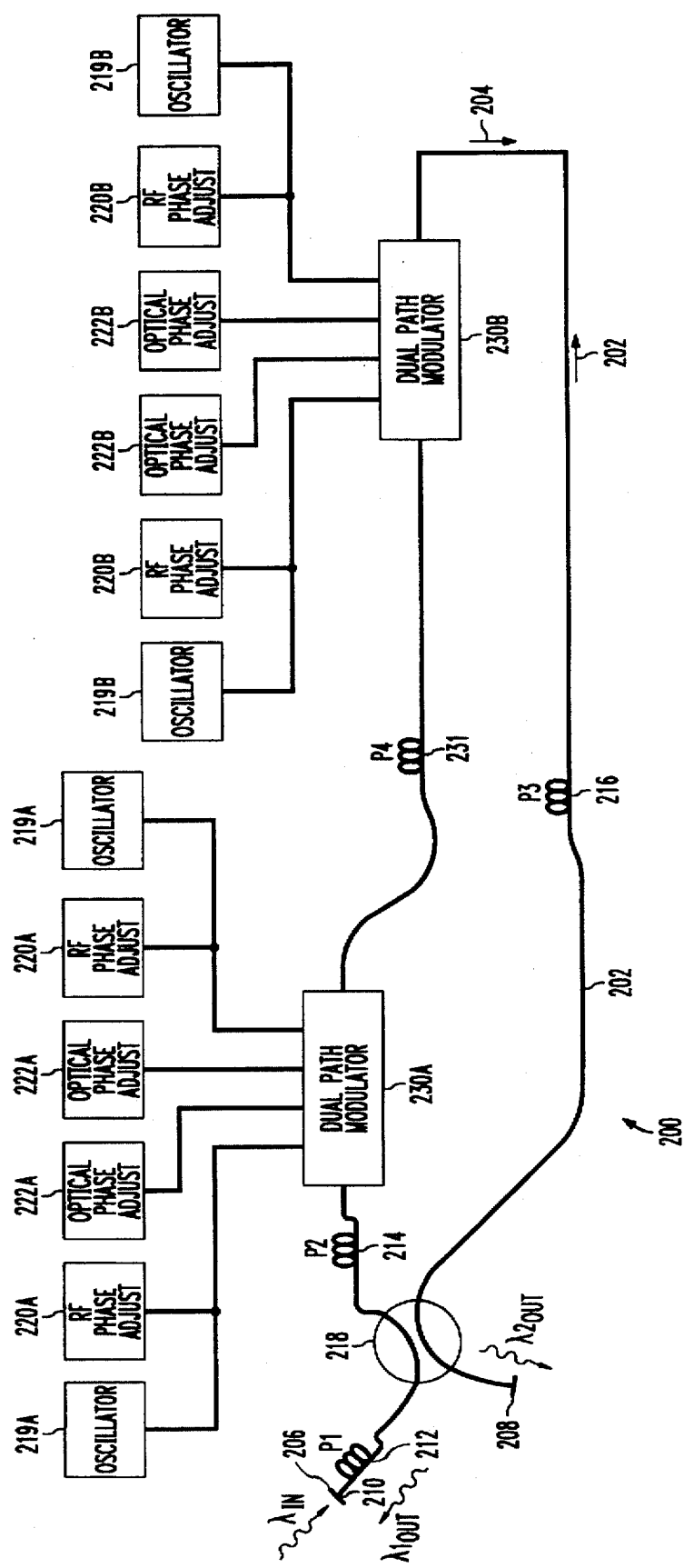
FIG. 5 is a single sideband modulator circuit using two dual path modulators in accordance with another embodiment of the present invention.

With reference now to FIG. 5, an alternate embodiment of a single sideband modulator circuit 200 in accordance with the present invention is there depicted. As shown, circuit 200 is similar to circuit 100 of FIG. 4 except that the single dual path modulator 130 of FIG. 4 has been replaced by two dual path modulators 230A and 230B which are driven in opposite or opposing relation. In other words, an RF signal of appropriate frequency is applied to one dual path modulator for modulating or creating sidebands in a counter-clockwise optical signal and is applied to another dual path modulator to modulate and produce sidebands in a clockwise optical signal.

Circuit 200 has an input port 206 which receives an incoming optical signal $\lambda_{in}$ that has its polarization modified by polarization controller 212 and then directed to a splitter/coupler 218. Like splitter/coupler 118 described above, splitter/coupler 218 divides $\lambda_{in}$ into two optical signals having equal (or unequal) power distribution, with one signal portion travelling in counter-clockwise direction 202 and the other signal portion travelling in a clockwise direction 204. The polarization of each optical signal portion is again adjusted by a polarization controller (214 for the clockwise direction optical signal portion and 216 for the counter-clockwise optical signal portion) prior to entry into the dual path modulators 230A and 230B. Dual path modulator 230A has RF signals applied thereto by RF oscillators 219A which, in turn, are connected to RF phase adjust circuits 220A for adjusting the phase angles of the generated RF signals. In addition, optical phase adjust circuits 222A are connected to dual path modulator 230A for adjusting the optical phase angles of the optical signal portions that are modulated by modulator 230A. Likewise, dual path modulator 230B has RF signals provided thereto by RF modulators 219B which are connected to RF phase adjust circuits 220B for adjusting the phase angles of the RF signals provided by oscillator 219B, and optical phase adjust circuits 222B are connected to dual path modulator 230B for adjusting the phase angles of the optical signal portion modulated by dual path modulator 230B. A polarization controller 231 (P4) is positioned between the two dual path modulators to adjust the polarization of the optical signal portions exchanged between the modulators.

By configuring dual path modulator 230A for modulating the clockwise optical signal portion 204 and by configuring dual path modulator 230B for modulating the counter-clockwise optical signal portion 202, each optical signal portion will have sidebands generated by one of the dual path modulators, with the other dual path modulator simply passing and not further acting upon the optical signal portion which has or will be modulated by the first dual path modulator. For example, counter-clockwise optical signal portion 202 will be modulated by dual path modulator 230B with phase adjusters 222A and 222B so that a single sideband and carrier band result, and the polarization of the modulated signal will be adjusted by polarization controller 231 disposed between the two dual path modulators. The signal will then pass through dual path modulator 230A without being further modulated by the RF signal generated by oscillators 219A because the counter-clockwise optical signal portion is travelling in a direction opposite to the RF signal from oscillators 219A. The same result occurs for the clockwise signal portion, i.e. it is modulated by dual path modulator 230A so that a single sideband and the optical carrier band remains. By properly adjusting the RF signal and optical signal phase angles, when each modulated signal is recombined by combiner/splitter 218 the carrier portions will cancel and the single sideband from each signal will be summed. In other words, the resulting output optical signals $\lambda 1_{out}$ or $\lambda 2_{out}$, which can be provided to either output port 208 or 210, will have twice the power as the optical signal generated by single sideband circuit 100 in FIG. 4 because two resulting sidebands are added.

It should be noted that the polarization controllers in both circuit 100 and circuit 200 are not needed if polarization preserving optical fibers are used for optical fibers 101 and 202. However, where such polarization preserving fibers are used, the splitter/coupler 218 cannot direct the resulting output optical signal among one of the two available output ports.

Figure 6:
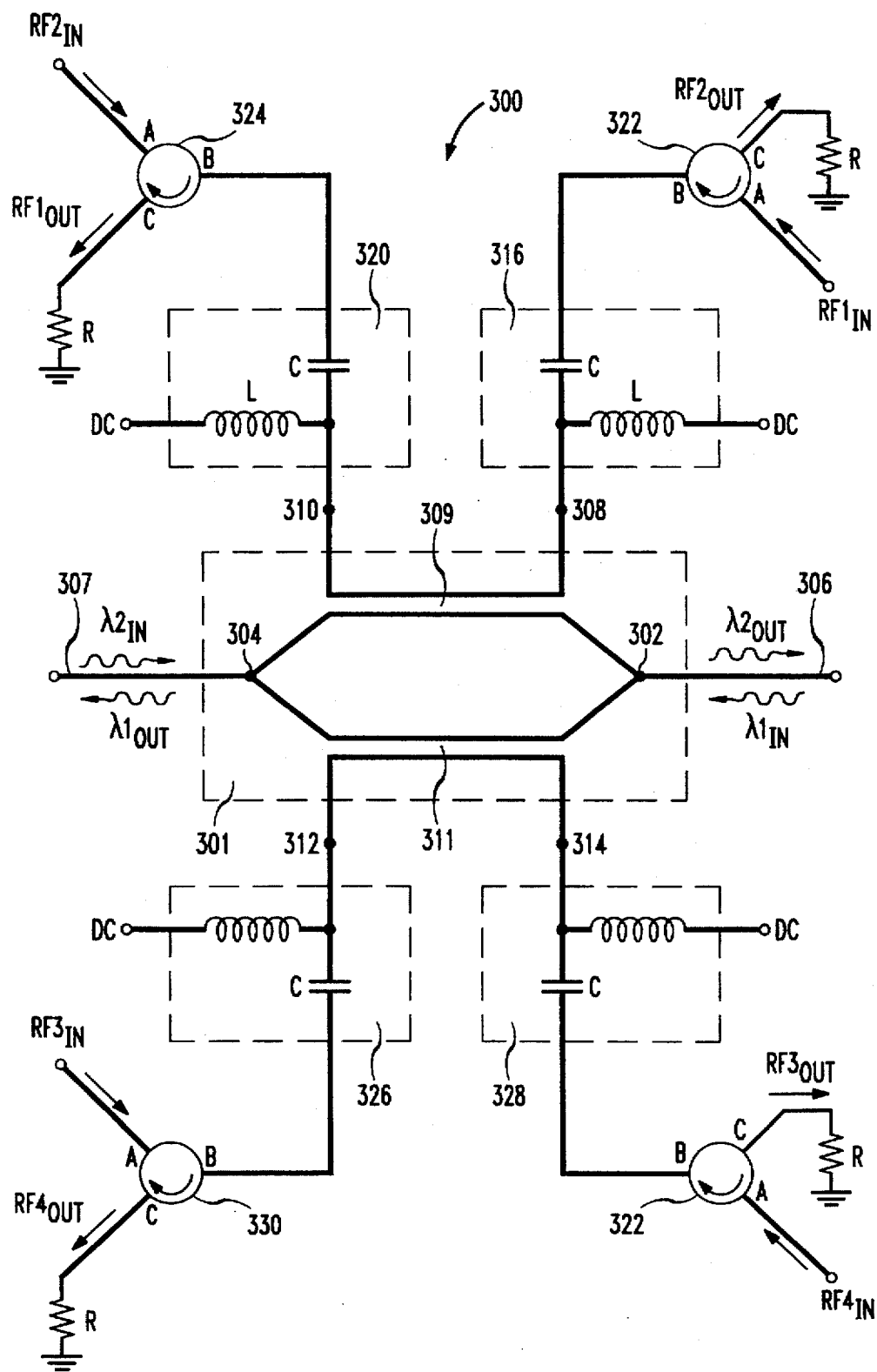
FIG. 6 is a single sideband modulator circuit employing a single dual path modulator in accordance with yet another embodiment of the present invention.

With reference now to FIG. 6, another alternative embodiment of the present invention is depicted. The embodiment of FIG. 6 provides an optical circuit for single sideband modulation of two optical signals, one travelling from left to right and the other travelling from right to left in FIG. 6, in which each optical signal is modulated with an RF signal. For example, an optical signal $\lambda 1_{in}$ travelling on an optical fiber 306 from right to left will be modulated by one pair of RF signals ($RF1_{in}$, $RF4_{in}$) so that a single sideband is produced together with the residual carrier, whereas an optical signal $\lambda 2_{in}$ travelling on an optical fiber 307 from left to right will be modulated by different RF signals ($RF2_{in}$, $RF3_{in}$) so that a single sideband will also be produced together with the residual carrier.

As shown, the single sideband modulator device 300 includes a dual path modulator 301 coupled to an optical fiber 306 for directing optical signal $\lambda 1_{in}$ to a coupler/splitter 302 which divides $\lambda 1_{in}$ into two portions. Likewise, the second optical signal $\lambda 2_{in}$ is fed by optical fiber 307 to coupler/splitter 304 of the dual path modulator which, in turn, divides $\lambda 2_{in}$ into two portions. Electrical terminals 308, 310, 312, and 314, which are connected to the striplines of the dual path modulator, each serve to input and output an RF signal that modulates the optical signal portions provided to the dual path modulator 301.

For example, and for simplicity with reference only to terminal 308, a circulator 322 is provided for interfacing an RF signal ($RF1_{in}$) to electrical terminal 308. Circulator 322 contains three ports (ports A, B and C), with port A being interfaced with an RF source for receiving RF signal $RF1_{in}$ through terminal A of the circulator 322. As is known in the art, circulator 322 directs or routes a signal to the next circulator port in the direction of the circulator arrow (e.g. in the clockwise direction). Thus, $RF1_{in}$ is directed from circulator terminal A to circulator terminal B. A bias tee 316 is included for interfacing circulator 322 with electrical terminal 308. Bias tee 316, which is also known to those having ordinary skill in the art, allows two signals to be applied to a common node without either signal affecting the other. Bias tee 316 has a capacitor C and an inductor L. The capacitor receives signal $RF1_{in}$ from port B of the circulator 322 and provides it to electrical terminal 308, whereas a DC signal—for adjusting the phase angle of an optical signal travelling through the upper arm of dual path modulator 301—is applied to inductor L.

With continued reference to FIG. 6, $RF1_{in}$ is input to terminal 308, travels though stripline 309 and exits at electrical terminal 310 which, as shown, is interfaced with another bias tee 320 (also having a DC port) which provides the $RF1_{in}$ signal to another circulator 324. Signal $RF1_{in}$ is provided to circulator 324 at port B and is directed to terminal C through a resistor R and then to ground. The outputted signal is designated $RF1_{out}$.

As explained above, for certain RF frequencies, a dual path modulator will modulate an optical signal with an RF signal only if that the optical signal travels in the direction of the RF signal. Thus, and with further reference to FIG. 6, $RF1_{in}$ is shown travelling from circulator 322 to circulator 324 via terminals 308 and 310 of the dual path modulator 301. As a consequence, as optical signal $\lambda 1_{in}$ travels through dual path modulator 301 by being input to coupler/splitter 302 and output through coupler/splitter 304, optical signal $\lambda 1_{in}$ is modulated by RF1 so that sidebands are produced.

The other portion of dual path modulator 301, i.e. the portion at the lower part of FIG. 6, operates in a similar manner to that discussed above. For example, in the lower fight part of FIG. 6, $RF4_{in}$ is input to a circulator 332 and is input to arm 311 of dual path modulator 301 through terminal 314 and output through terminal 312 to circulator 330. Thus, when $\lambda 1_{in}$ is provided to coupler/splitter 302, the optical signal is divided and modulated through each waveguide 309 and 311 of the optical modulator and then the modulated portions are recombined by coupler/splitter 304, the resulting signal being designated $\lambda 1_{out}$. As set forth above, for certain conditions of phases, the resulting signal $\lambda 1_{out}$ contains a single sideband and a carrier band.

Likewise, optical signal $\lambda 2_{in}$ will be modulated by RF signals $RF2_{in}$ and $RF3_{in}$ which are, respectively, input to circulator 324—in the top left portion of FIG. 6 for input through terminal 310 and output through terminal 308 of modulator 301; and to circulator 330—in the bottom left portion of FIG. 6 for input through terminal 312 and output through terminal 314 of modulator 301. $RF3_{in}$ and $RF2_{in}$ are provided to dual path modulator 301 through bias tees 320 and 326. Thus, optical signal $\lambda 2_{in}$ is divided by coupler/splitter 304, and is modulated by $RF2_{in}$ and $RF3_{in}$ (in a like manner as optical signal $\lambda 1_{in}$ is modulated by signal $RF1_{in}$ and $RF4_{in}$), is recombined at splitter/coupler 302 so that output optical signal $\lambda 2_{out}$ contains a single sideband and a carrier band.

Again, by properly adjusting the optical phase angles by providing the proper DC level to the inductors in the bias tees so that a first common DC signal is provided to bias tees 316 or 320, and a second common DC signal is provided to bias tees 314 or 326, the resulting output signals $\lambda 1_{out}$ and $\lambda 2_{out}$ call be recombined, in a combiner/splitter, so that the carrier bands are cancelled and the resulting sidebands are added. A single sideband having twice the power is thereby obtained.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, although two oscillators, RF phase adjust circuits and optical phase adjust circuits are shown connected to the dual path modulators of the embodiments discussed hereinabove, it will be readily understood that single combined units having separate adjust features to separately adjust the RF and optical phase angles, can also be employed. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A single sideband modulator circuit for modulating an optical signal with an RF signal to produce a single sideband frequency shifted replica of the optical signal, the optical signal being carded by an optical fiber, said circuit comprising:

optical signal phase adjust means for adjusting the phase angle of the optical signal;

RF signal phase adjust means for adjusting the phase angle of the RF signal;

a dual path modulator connected to said optical signal phase adjust means and to said RF signal phase adjust means and having two optical signal terminals for inputting and outputting optical signals and a first electrical terminal for inputting the RF signal in a first direction, the optical signal being input to one of said optical signal terminals so that the optical signal propagates through the dual path modulator in said first direction for forming a first optical output signal having a first sideband and at least one of a carrier band and a second sideband and that is output at the other of said optical signal terminals, the optical signal also being input to said other optical signal terminal so that the optical signal propagates through the dual path modulator in a second direction different from said first direction of the RF signal for forming a second optical output signal having said at least one of said carrier band and said second sideband and that is output at said one optical signal terminal; and a combiner for combining the first and second optical output signals to form a combined optical output signal having a first power level so that said at least one of said carrier band and said second sideband in the first and second optical output signals cancel out.

2. The circuit of claim 1, further comprising a bias tee connected between the optical signal phase adjust means, the RF signal phase adjust means and said first electrical terminal.

3. The circuit of claim 2, further comprising a circulator connected to said bias tee for providing the RF signal to said first electrical terminal.

4. The circuit of claim 1, further comprising a first polarization controller for adjusting the polarization of the optical signal applied to said one optical signal terminal, and a second polarization controller for adjusting the polarization of the optical signal applied to said other optical signal terminal.

5. The circuit of claim 4, wherein said combiner is connected between said first and second polarization controllers, said circuit further comprising an input port for receiving the optical signal and for providing the optical signal to the combiner, and at least two output ports to which said combined optical output signal is selectively directed by said combiner, said combiner dividing said optical signal into first and second portions, respectively provided to said first polarizer and to said second polarizer.

6. The circuit of claim 1, wherein said dual path modulator includes a second electrical terminal for applying said RF signal in said second direction, said circuit further comprising:

a second optical signal phase adjust means for adjusting the phase angle of the optical signal propagating through the dual path modulator in said second direction; and a second RF signal phase adjust means for adjusting the phase angle of the RF signal applied to said second electrical terminal, so that said second optical output signal further comprises said first sideband, said first sidebands of said first and said second optical output signals being added together by said combiner so that said at least one of said carrier band and said second sideband are cancelled out in said combiner and the resulting optical output signal has a second power level greater than said first power level.

7. The circuit of claim 1, wherein said dual path modulator comprises a first dual path modulator and said first optical output comprises a first modulated optical output, said circuit further comprising:

a second dual path modulator connected to said first dual path modulator, to said optical signal phase adjust means and to said RF signal phase adjust means and having two optical signal terminals for inputting and outputting optical signals and a first electrical terminal for inputting the RF signal in said second direction, the optical signal being input to one of said optical signal terminals of said second dual path modulator so that the optical signal propagates through the second dual path modulator in the second direction for forming a second modulated optical output signal having said first sideband and at least one of said carrier band and said second sideband that is output at the other of said optical signal terminals of said second dual path modulator, said first sidebands of said first and said second modulated optical output signals being added together by said combiner so that said at least one of said carrier band and said second side band are cancelled out in said combiner and the resulting optical output signal has a second power level greater than said first power level.

8. The circuit of claim 7, further comprising a polarization controller connected between said first and second dual path modulators.

* * * * *